(12) United States Patent
Hamad (10) Patent No.: US 9,175,591 B2
(45) Date of Patent: Nov. 3, 2015

(54) PROCESS AND SYSTEM EMPLOYING PHASE-CHANGING ABSORBENTS AND MAGNETICALLY RESPONSIVE SORBENT PARTICLES FOR ON-BOARD RECOVERY OF CARBON DIOXIDE FROM MOBILE SOURCES

(71) Applicant: Saudi Arabian Oil Company, Dhahran (SA)

(72) Inventor: Esam Zaki Hamad, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 270 days.

(21) Appl. No.: 13/958,080

(22) Filed: Aug. 2, 2013

(65) Prior Publication Data

US 2014/0099245 A1 Apr. 10, 2014

Related U.S. Application Data

(60) Provisional application No. 61/682,850, filed on Oct. 5, 2012, provisional application No. 61/715,933, filed on Oct. 19, 2012.

(51) Int. Cl.
*B01D 53/92* (2006.01)
*B01D 53/96* (2006.01)
(Continued)

(52) U.S. Cl.
CPC .............. *F01N 3/0857* (2013.01); *B01D 53/62* (2013.01); *B01D 53/80* (2013.01); *B01D 53/92* (2013.01); *B01D 53/78* (2013.01); *B01D 53/83* (2013.01); *B01D 2251/402* (2013.01); *B01D 2251/404* (2013.01); *B01D 2251/602* (2013.01); *B01D 2251/606* (2013.01); *B01D 2252/2041* (2013.01); *B01D 2252/30* (2013.01); *B01D 2253/102* (2013.01); *B01D 2253/108* (2013.01); *B01D 2253/204* (2013.01); *B01D 2257/504* (2013.01); *B01D 2259/4566* (2013.01); *B01D2259/65* (2013.01); *B01D 2259/814* (2013.01); *Y02C 10/04* (2013.01)

(58) Field of Classification Search
CPC .......... B01D 53/92; B01D 53/96; F01N 3/04; F01N 3/08; F01N 3/0807; F01N 3/0857; F01N 3/0885
See application file for complete search history.

(56) References Cited

U.S. PATENT DOCUMENTS 3,875,743 A * 4/1975 Mercer ........................... 60/275
8,603,422 B2 * 12/2013 Maruyama et al. ........... 423/212

(Continued)

*Primary Examiner* — Timothy Vanoy
(74) *Attorney, Agent, or Firm* — Abelman, Frayne & Schwab (57) ABSTRACT

A method and system are described for the on-board treatment of a hydrocarbon-fueled internal combustion engine (ICE) exhaust gas stream to reduce $CO_2$ emissions from the vehicle which include:

a. contacting the exhaust gas stream with a $CO_2$ sorbent capture agent on board the vehicle to produce a mixture containing modified $CO_2$-containing sorbent and a treated exhaust gas stream with reduced $CO_2$ content;
b. separating the modified $CO_2$-containing sorbent from the treated exhaust gas stream;
c. passing the modified sorbent in heat exchange with heat from the ICE to release $CO_2$ and regenerate the $CO_2$ sorbent capture agent;
d. recycling the regenerated $CO_2$ sorbent for use in step (a);
e. discharging the treated exhaust gas stream having a reduced $CO_2$ content into the atmosphere;
f. recovering and compressing the $CO_2$ for temporary storage on board the vehicle.

20 Claims, 3 Drawing Sheets

(51) Int. Cl.
*F01N 3/04* (2006.01)
*F01N 3/08* (2006.01)
*B01D 53/62* (2006.01)
*B01D 53/80* (2006.01)
*B01D 53/78* (2006.01)
*B01D 53/83* (2006.01)

(56) References Cited

U.S. PATENT DOCUMENTS

2009/0178556 A1* 7/2009 Hoshi et al. .................. 95/28
2013/0298761 A1* 11/2013 Hamad ......................... 95/11

* cited by examiner

PROCESS AND SYSTEM EMPLOYING PHASE-CHANGING ABSORBENTS AND MAGNETICALLY RESPONSIVE SORBENT PARTICLES FOR ON-BOARD RECOVERY OF CARBON DIOXIDE FROM MOBILE SOURCES

RELATED APPLICATIONS

This application claims priority to provisional patent application U.S. Ser. No. 61/682,850 filed Oct. 5, 2012 and U.S. Ser. No. 61/715,933 filed Oct. 19, 2012, the contents of which are incorporated herein by reference.

BACKGROUND OF THE INVENTION

1. Field of the Invention

The present invention relates to the reduction of carbon dioxide emissions from the exhaust gas stream of vehicles powered by internal combustion engines and other heat engines that produce waste heat.

2. Description of Related Art

The currently accepted thinking is that global warming is due to emissions of greenhouse gases such as carbon dioxide ($CO_2$) and methane ($CH_4$). About a quarter of global $CO_2$ emissions are currently estimated to come from mobile sources, i.e., automobiles, trucks, buses and trains that are powered by internal combustion engines (ICEs). This proportional contribution is likely to grow rapidly in the foreseeable future with the projected surge in automobile and truck ownership in developing countries. At present, the transportation sector is a major market for crude oil, and controlling $CO_2$ emissions is both an environmental responsibility and a desirable goal in order to maintain the viability of the crude oil market in the transportation sector in the face of challenges from alternative technologies, e.g., cars powered by electric motors and storage batteries. Regulations to limit $CO_2$ emissions from the tail pipe have been enacted in many countries.

$CO_2$ management from mobile sources presents many challenges including space and weight limitations, the lack of any economies of scale and the dynamic nature of the operation of the ICEs powering the mobile sources.

Prior art methods for the capture of $CO_2$ from combustion gases have principally focused on stationary sources, such as power plants. Those that address the problem of reducing $CO_2$ emissions from mobile sources employ either combustion using oxygen, provide no means for the regeneration and reuse of the $CO_2$ capture agent, and/or make no use of waste heat recovered from the hot source. Combustion using oxygen requires an oxygen-nitrogen separation step which is more energy-intensive than separating $CO_2$ from the exhaust gases and would be more difficult if attempted on board the vehicle.

The focus of $CO_2$ capture technology has been on stationary or fixed sources. Processes have been developed that use amines and amine functionalized liquids and solutions to absorb $CO_2$ at temperatures ranging from ambient up to about 80° C. At temperatures above 100° C., and particularly in the range of from about 130° C. to 300° C. that are encountered in vehicles powered by an ICE, the amine solutions exhibit low capacity for $CO_2$ absorption. Thus, the high temperature of the ICE exhaust gas makes direct treatment to remove $CO_2$ with liquid amine solutions impractical without cooling the exhaust gas.

The capture of $CO_2$ from mobile sources has generally been considered too expensive, since it involves a distributed system with a reverse economy of scale. The prior solution to the problem has appeared to be impractical due to on-board vehicle space limitations, the additional energy and apparatus requirements and the dynamic nature of the vehicle's operating cycle, e.g., intermittent periods of rapid acceleration and deceleration.

It is therefore an object of the present invention to provide a method, a system and an apparatus which address the problems of efficiently and cost-effectively reducing the $CO_2$ emissions from vehicles by temporary on-board storage of the $CO_2$.

As used herein, the term "internal combustion engine," or ICE, includes heat engines in which a carbon-containing fuel is burned to produce power or work and generates waste heat that must be removed or dissipated.

As used herein, the term "mobile source" means any of the wide variety of known conveyances that can be used to transport goods and/or people that are powered by one or more internal combustion engines that produce an exhaust gas stream containing $CO_2$. This includes all types of motor vehicles that travel on land, as well as trains and ships where the exhaust gas from the ICE is discharged into a containing conduit before it is discharged into the atmosphere.

The term "vehicle" as used herein is to be understood as a convenient shorthand and synonymous with "mobile source" and is coextensive with "conveyances", generally, as that term is used above.

As used herein, the terms "$CO_2$ capture agent" and "capture agent" mean a phase-changing absorbent liquid or a solid adsorbent material having a magnetic core that has a predictable capacity to absorb or adsorb $CO_2$ reversibly over a significant number of absorption/adsorption and desorption cycles.

As used herein, the term "waste heat" is the heat that a typical engine produces which is contained mainly in the hot exhaust gases ranging from about 300° C. to 650° C. and the hot engine coolant from about 80° C. to 120° C. in liquid coolant systems. Additional heat is emitted and lost by convection and radiation from the engine block and its associated components, and other components through which the exhaust gas passes, including the cylinders in air-cooled engines, the manifold, pipes, catalytic converter and muffler, and the engine's liquid coolant and the hot engine oil. This waste heat energy totals about 60-75% of the energy that typical hydrocarbon fuels provide.

The ICE can be air-cooled, in which case there will be no source of hot engine coolant. However, the engine block and associated metal components can provide the heat required to release the $CO_2$ from, and thereby regenerate the $CO_2$ capture agent. In the case of a manual gear shift as distinguished from an automatic transmission, there will be no source of hot transmission fluid.

SUMMARY OF THE INVENTION

The process and system of the present invention comprehends the absorption or adsorption of $CO_2$ from the exhaust gas stream of an ICE on board the vehicle using a chemical phase-changing absorbent, or a solid $CO_2$ capture agent having a magnetic core suspended in a carrying liquid. The sorption is reversible, e.g., as by increasing the temperature and/or reducing the pressure to cause the absorbed/adsorbed $CO_2$ to be released and the absorbent/adsorbent material to be regenerated to thereby permit the material to be recycled for further use in the process.

One advantage of the present invention over prior art processes for reducing $CO_2$ emissions from fixed sources such as power generation facilities is the ready availability on board the mobile source of relatively high to moderate temperature waste heat. The cost of the heat energy is a major item of expense for $CO_2$ capture from fixed sources because the temperature of the flue gases from a coal-fired or gas-fired electric power generation facility has been reduced in order to maximize the electrical energy generating values of the fuel and to minimize the amount of waste heat discharged into the environment. Flue gas temperature reduction is also important for capturing sulfur oxides (SOx) and nitrogen oxides (NOx) as pollutants in power plants that burn sulfur-containing fuels.

The waste heat that a typical engine produces consists mainly of hot exhaust gases that can range in temperature from ~300° C. to 650° C. and hot coolant ranging from about 80° C. to 120° C. This heat energy totals about 60-75% of the total energy that typical hydrocarbon fuels produce upon combustion in an ICE. The engine block, intake and exhaust manifolds, transmission housing, parts and fluid, as well as associated metal components are sources of this heat.

Energy is needed to separate the $CO_2$ from the exhaust gases and to compress, liquefy or freeze all or part of the captured $CO_2$ for efficient on-board storage. This energy is typically a mix of work and heat energies. The work component of the energy is generated by using part of the waste heat to produce this work. Some waste heat can be used by direct heat exchange to regenerate the sorbent capture materials used in the $CO_2$ separation step of the process.

The present invention solves the problems of space limitations and auxiliary power requirements by using the free energy that is available on board the vehicle as waste heat to capture $CO_2$ and increase its density for temporary storage until the vehicle is refueled, or otherwise can discharge the pressurized $CO_2$ gas or liquid, or the cold solid $CO_2$ for permanent storage. The use of the waste heat to provide the energy for capture, regeneration and densification significantly reduces the capture cost and the densification will reduce the volume requirement for temporary on-board storage of the $CO_2$. Converting the waste heat into electrical or other useable forms of work energy also reduces or eliminates the amount of fuel that is consumed by the vehicle in contributing mechanical energy for the densification step, and thereby a corresponding reduction in the amount of $CO_2$ in the exhaust gas stream.

The increase in the density of the captured $CO_2$ for efficient on-board temporary storage is accomplished by compression, liquefaction, or by freezing the gas to form solid $CO_2$, i.e., dry ice. The final density of the $CO_2$ will be in the range of from 5-1600 $kg/m^3$, depending upon its state, i.e., gas, liquid and/or solid. At least a part of the total work energy required for the densification is obtained from the waste heat by using heat-to-power conversion.

During start-up of the $CO_2$ capture cycle, or to meet a temporary requirement of other special operational needs of the vehicle, part of the engine's power or, alternatively, the electricity stored in on-board batteries can be used. During the normal operation of the system, at least a portion of the energy required for $CO_2$ capture and densification will come from conversion of the ICE's waste heat into, e.g., electrical energy.

The invention broadly comprehends a method and system for the treatment on-board a vehicle of a $CO_2$-containing hot exhaust gas stream emitted by a hydrocarbon-fueled internal combustion engine (ICE) used to power the vehicle in order to reduce the amount of $CO_2$ discharged into the atmosphere which includes:

a. contacting the exhaust gas stream with a novel $CO_2$ capture agent on board the vehicle to produce a mixture of (i) a modified sorbent with captured $CO_2$ and (ii) a treated exhaust gas stream having a correspondingly reduced $CO_2$ content, where the capture agent is selected from a phase-changing liquid that reversibly reacts with $CO_2$ to form a new solid or liquid phase, or magnetically responsive sorbent particles formed from a magnetic core securely coated with a $CO_2$ adsorbing material;

b. separating the modified sorbent with captured $CO_2$ from the treated exhaust gas stream;

c. passing the modified sorbent with captured $CO_2$ in heat exchange relation with the hot exhaust gas stream emitted by the ICE, or with the vehicle's hot coolant, hot engine oil or transmission oil, or the hot engine block, manifold or other metal component part or parts to release the captured $CO_2$ as a gas stream and to regenerate the $CO_2$ capture agent using heat from the exhaust gas stream to reduce the temperature of the exhaust gas stream before it is brought into contact with the $CO_2$ capture agent in step (a);

d. recycling the regenerated $CO_2$ capture agent for use in step (a);

e. discharging the treated exhaust gas stream having a reduced $CO_2$ content into the atmosphere;

f. recovering an essentially pure $CO_2$ gas stream;

g. compressing the recovered $CO_2$ on board the vehicle to reduce its volume; and h. temporarily storing the compressed $CO_2$ on board the vehicle.

In one embodiment of the present invention, the $CO_2$ capture agent employed is a phase-changing reactive liquid. In this process, the temperature of the exhaust gas stream is reduced prior to intimate mixing with an excess of the reactive liquid. The $CO_2$ reacts reversibly with the liquid to form a new solid or liquid phase which is not soluble in the remaining reactive liquid, and the remaining exhaust gas stream that has a reduced $CO_2$ content is separated and discharged into the atmosphere as the $CO_2$-lean exhaust gas stream. After separation of the remaining exhaust gas, the temperature of the reactive liquid and $CO_2$-containing compound is raised to promote the reverse reaction and release the $CO_2$ as a gas, which is then separated from the reactive liquid and the $CO_2$ is recovered for temporary storage on board the vehicle. The regenerated reactive liquid is cooled by passage through a heat exchanger, e.g., by ambient air.

In a preferred embodiment, the phase-changing liquid is a switchable ionic liquid (SIL). SIL's are extremely effective in $CO_2$ capture and can be easily regenerated and recycled, and are relatively easy to prepare compared to so-called "classical" ionic liquids. SILs have been found to be efficient absorbents at atmospheric pressure. The SILs can be selected from the group consisting of liquid di-amines and compounds that are functionalized with one or more amine groups that reversibly combine with $CO_2$. Examples of SILs include the compound listed below in Table 1 and mixtures of an amidine such as 1,8-diazabicyclo[5.4.0]undec-7-ene (DBU), with an alcohol such as 1-hexanol or an amino alcohol such as 6-amino-1-hexanol. See E, Privalova et al., *$CO_2$ removal with 'switchable' versus 'classical' ionic liquids,* Separation and Purification Technology 97 (2012) 42-50, the disclosure of which is hereby incorporated by reference.

In another embodiment, the $CO_2$ capture agent is in the form of solid particles comprised of a $CO_2$ sorbent material applied to a magnetic core. As used in this embodiment, the term "magnetic core" means a material that is responsive to a magnetic field and will move predictably in the presence of an applied magnetic field. The magnetic core carrying a coating or outer surface layer of a material that is a sorbent for $CO_2$ will be referred to in the description of the invention that follows as a "magnetically responsive sorbent particle", and will be understood to be a discreet and durable structure that is sufficiently responsive to the localized magnetic field to move through a liquid carrier of predetermined viscosity to effect a ready separation of the coated magnetic particles. As prepared, these particles are dry and flowable with a hard exterior coating that is resistant to cracking and powdering.

The magnetically responsive sorbent particles are mixed with the optionally cooled exhaust gas stream to adsorb or absorb $CO_2$. The solid particles with captured $CO_2$ are separated from the remaining exhaust gas stream of reduced $CO_2$ content which is discharged into the atmosphere. The $CO_2$ is released and separated from the solid magnetically responsive sorbent particles by increasing the temperature of the particles by heat exchange with waste heat from the ICE. The $CO_2$ is recovered as a separate gas stream as described above for temporary on-board storage and the now regenerated sorbent on the solid particles are recycled for use in the process.

In another aspect of this embodiment of the invention, a process or method is provided for preparing a magnetically responsive sorbent particle that is a magnetic nanoparticle. The process for producing the coated magnetic nanoparticles comprises of three principal steps. First, magnetite particles are synthesized by co-precipitation of iron (II) and iron (III) to form $Fe_3O_4$ (magnetite) nanoparticles. Conventionally, magnetite is prepared by adding a base to an aqueous mixture of Fe2+ and Fe3+ chloride at a 1:2 molar ratio. The particles are also commercially available from chemical suppliers, such as SigmaAldrich, with 5, 10, 20 and 50 nm average particle size. The second step is to prepare a mixed salt slurry, or mixed salt solution of the desired coating or shell material that will adsorb $CO_2$. The third step is to coat the slurry or the solution onto the magnetic particles and then dry and calcine the particles at the appropriate temperature. Any of various known industrial processes can be employed to coat the magnetic particles with the $CO_2$ sorbent material. For example, spray drying can be used to produce large quantities of the coated magnetic particles after dispersing the core magnetic particles in the desired solution.

Other types of particles can also be used. For example, the preparation of amine-coated magnetic particles is described in Colloids and Surfaces A, 346, 221-228, 2009. The preparation of zeolite coated magnetic particles is described in Advanced Material 21, 1377-1382, 2009. A method of preparing activated-carbon coated magnetic particles is described in Chemosphere 85, 1269-1276, 2011.

Suitable solid capture reagents include metal carbonates, bi-carbonates, metal oxides such as MgO and CaO or mixed metal oxides, activated carbons, zeolites, metal-organic framework (MOF) materials and organic-inorganic hybrids. The magnetic core can be formed from magnetic materials such as iron, cobalt, and their respective oxides. See, for example, The American Institute of Chemical Engineers (AIChE) Journal, Vol. 50, No. 11, 2835, November 2004 for these materials.

EXAMPLE 1

A conventional gasoline used to fuel an ICE produces an exhaust gas stream having a composition in mole percent of 13% $CO_2$, 13% water vapor ($H_2O$), 73% nitrogen and 1% of other inert gases. Table 1 shows the calculated estimation of the maximum $CO_2$ capture capacity from this exhaust gas steam for liquid 1,3-Bis(3-aminopropyl)-1,1,3,3-tetramethyldisiloxane at an optimum capture temperature in the range of from 35° to 55° C.

TABLE 1

| Liquid | Estimated maximum $CO_2$ capacity at optimum capture temperature |
|---|---|
| $H_2N{\sim}Si(CH_3)_2{-}O{-}Si(CH_3)_2{\sim}NH_2$ | 16 wt % |

EXAMPLE 2

This example assumes the same composition of an exhaust gas in mole percent, e.g., 13% $CO_2$, 13% water vapor ($H_2O$), 73% nitrogen and 1% of other inert gases. Table 2 shows the calculated estimation of the optimum $CO_2$ capture temperature, $CO_2$ capacity and regeneration temperature of MgO solid capture reagent preparations.

TABLE 2

| Suspension of MgO based particles in liquid | Estimated Range of optimum $CO_2$ capture Temperature, °C. | Estimated Regeneration Temperature, °C. | Estimated maximum $CO_2$ capacity at optimum capture temperature |
|---|---|---|---|
| 25 wt % solid sorbent | 250-325 | >400 | 14 wt % |
| 50 wt % solid sorbent | 250-325 | >400 | 27 wt % |

In the example of Table 2, it is assumed that only half of the MgO is available for reaction with $CO_2$.

The magnetically responsive zeolites can be prepared by combining sol-gel synthesis with a vapor phase transport process, in which microspheres of magnetically responsive material (i.e., magnetite) are coated with a layer of silica via sol-gel process. The silica-coated microspheres are modified with a cationic polyelectrolyte, such as poly (diallydimethylammonium chloride), to deposit the negatively charged zeolitic seeds. The seeded microspheres are subjected to vapor phase transport process to convert the silica to zeolite crystals. See, e.g., Deng et al., "Synthesis of Core/Shell Colloidal Magnetic Zeolite Microspheres for the Immobilization of Trypsin," Advanced Materials, 21, 1377-1382, 2009, the disclosure of which is incorporated herein by reference.

In addition to the core/shell structure described above, other structures including both solid capture agents and magnetic materials have been disclosed in the art. For example, magnetite nanoparticles can be impregnated into the pores of activated carbon using nitric acid as a carbon modifying agent followed by calcination. See Do et al., "Activated Carbon/ $Fe_3O_4$ Nanoparticle Composite: Fabrication, Methyl Orange Removal and Regeneration by Hydrogen Peroxide," Chemosphere, 85, 1269-1276, 2011, the disclosure of which is incorporated herein by reference. Magnetic MOF nanocomposites can be synthesized by incorporation of magnetite nanorods with MOF nanocrystals of $Cu_3(BTC)_2$ (HKUST-1). See Ke et al., "Facile Fabrication of Magnetic Metal-Organic Framework Nanocomposites for Potential Targeted Drug Delivery," Journal of Materials Chemistry, 21, 3843-3848, 2011, the disclosure of which is incorporated herein by reference.

The liquid carrier can be one or a combination of (a) a high boiling temperature liquid or a eutectic salt mixture that provides stability to the particles by kinetic or thermodynamic means; or (b) a high boiling temperature solution of a material that stabilizes the suspended particles by kinetic or thermodynamic means.

The following are examples of various organic and inorganic eutectic mixtures, with their melting temperatures indicated parenthetically.

Examples of Eutectic Mixtures

Organic:

Choline chloride 50% and malonic acid 50% (10° C.)

Choline chloride 50% phenylpropionic (20° C.)

Choline chloride 50% phenylacetic (25° C.)

Choline chloride 50% and oxalic Acid 50% (34° C.)

Naphthalene 44% and biphenyl 56% (39° C.)

Inorganic:

$KNO_3$ 58%, $Ca(NO_3)_2$ 11% $LiNO_3$ 31% (117° C.)

$NaNO_3$ 18%, $KNO_3$ 52%, $LiNO_3$ 30% (120° C.)

$NaNO_3$ 21%, $KNO_3$ 49%, $Ca(NO_3)_2$ 30% (133° C.)

$NaNO_3$ 50%, $KNO_3$ 50%, (221° C.)

$NaNO_3$ 83.2%, NaOH 17.8% (250° C.)

$K_2CO_3$ 16.4%, $Li_2CO_3$ 26.4%, LiOH 57.1% (372° C.)

$K_2CO_3$ 26.8%, $Na_2CO_3$ 30.6%, $Li_2CO_3$ 42.5% (393° C.)

A preferred method of using eutectic mixtures is (a) when the melting temperature is below the $CO_2$ capture temperature of the material, and (b) when the particle-eutectic mixture interactions contribute to stabilizing the particles in the mixture.

Figure 3:
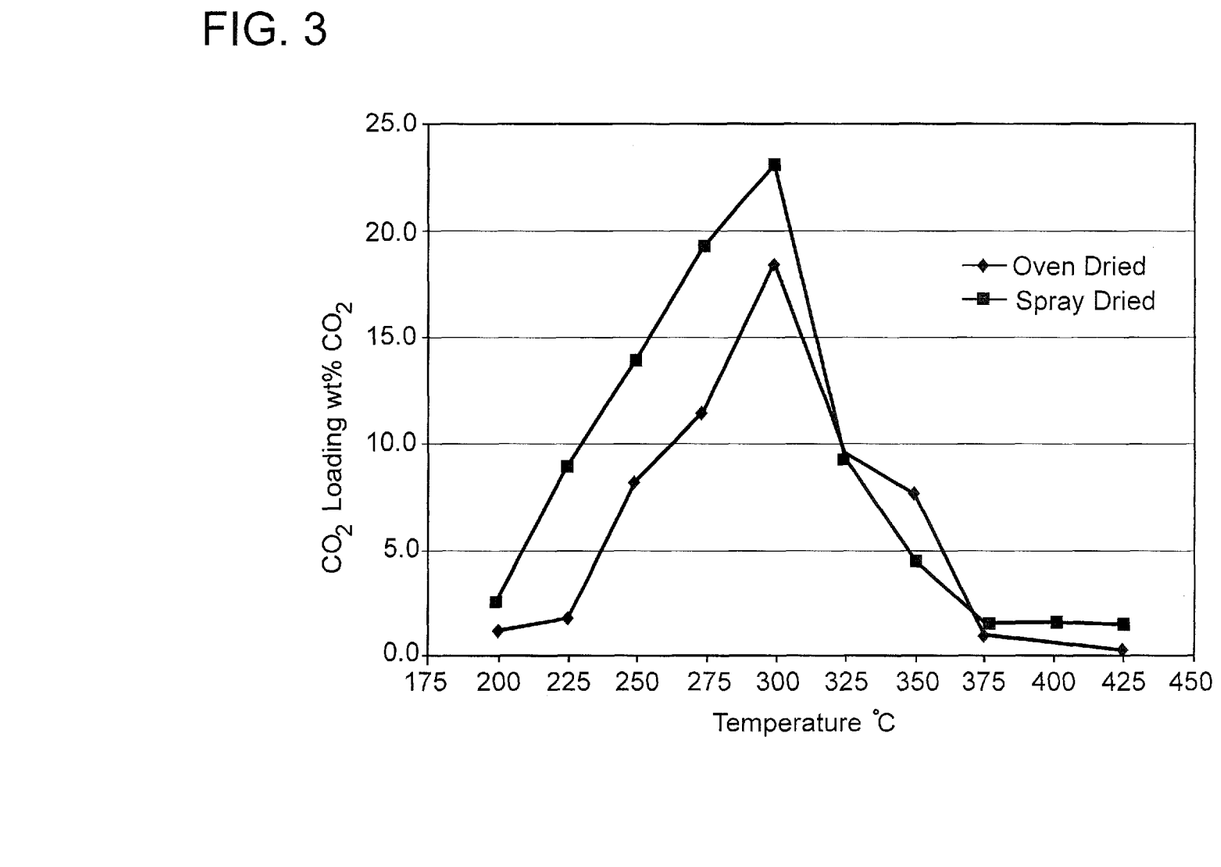
FIG. 3 is a chart illustrating the typical variation of $CO_2$ absorption capacity in relation to the operating temperature of a high boiling temperature colloidal solution of very small particles.

FIG. 3 is a chart illustrating the typical variation of $CO_2$ adsorption capacity in relation to the operating temperature of solid particles formed from $MgO:Na_2CO_3:NaNO_3$ in a mass ratio of 75.8:16:8.2. A spray drying process provides particles with more internal pathways for diffusion of $CO_2$ to the interior of the particle, and thus more surface area of MgO is available to react with the $CO_2$. The $CO_2$ adsorption capacity is about 23% at 300° C. for a spray dried particle, which is the optimum temperature for this type of adsorbent.

In the regeneration unit, heat is transferred from the exhaust gas stream to the sorbent having the captured $CO_2$ to release $CO_2$. Heat transfer can be accomplished using conventional heat exchange or heat transfer methods such as conduction or vapor condensation. For example, heat can be supplied to the sorbent slurry using a thermal conducting material, such as metal. If the sorbent is passed through tubes, the heat can be provided to the outside of tubes using conduction through by passing the hot exhaust gas stream through the shell. Fins, metal mesh inside the tubes and other designs and known techniques can be used to increase the surface area in contact with the sorbent and enhance the heat transfer. Fins and other surface configurations can also be used on the outer shell of the tube to enhance the heat transfer of the system.

The absorption unit provides direct intimate contact between the exhaust gas and the capture agent. Suitable devices include static and dynamic mixers, packed and tray columns and membrane contactors.

Kinetically stable colloids owe their observed stability to energetic and/or entropic barriers, the origin of which is largely accounted for by the well-known DLVO theory. Thermodynamically stable colloidal suspensions owe their stability to a very low interfacial tension between the continuous and dispersed phases. The details of kinetic and thermodynamic stability are well known and widely reported in the field of colloid science.

The following steps are employed to improve stability of the colloidal solution:
  a. adsorption of chain molecules;
  b. particle surface modification to increase repulsion between particles; and
  c. reduction of the particle size.

The particular materials utilized and the method of manufacture of the magnetically responsive sorbent particles are selected to produce a durable product that can be subjected to repeated use and regeneration in order to have an economically useful lifespan.

Other aspects, embodiments, and advantages of the process of the present invention are discussed in more detail below. It is to be understood that both the foregoing information and the following detailed description include illustrative examples of various aspects and embodiments that provide an understanding of the nature and character of the claimed features and embodiments. The accompanying drawings are included as examples to provide a further understanding of the various aspects and embodiments of the process and system.

BRIEF DESCRIPTION OF THE DRAWINGS

The foregoing summary, as well as the following detailed description will be best understood when read in conjunction with the attached drawings in which.

DETAILED DESCRIPTION OF THE INVENTION

The invention will be further described in more detail with reference to FIG. 1 which illustrates an embodiment of a system and apparatus 100 for the practice of a $CO_2$ absorption process which uses a chemical phase-changing sorbent. System 100 includes a regeneration zone 110, a chemical absorption/adsorption zone 122, a solid separation unit 130 and several heat recovery (HR) units as described in more detail below. In this description, it will be understood that each of the zones identified can contain one or more corresponding unit operations with one or more known pieces of apparatus which accomplish the functions and steps in the practice of the process of the invention.

Chemical sorbents such as liquid di-amines and other liquids functionalized with amine groups that form a reversible chemical bond with $CO_2$ as described above can be used in the process of the invention. An example of a suitable chemical sorbent is liquid GAP-0 carbamate which reversibly reacts with $CO_2$ to form a new solid compound. The reaction proceeds as follows:

(1)

The captured $CO_2$ can be released from the sorbent by heating the solid material, in which process the solid sorbent changes back to the liquid phase, as represented by the following:

(2)

In the chemical process of $CO_2$ capture, a hot exhaust gas stream 102 from a vehicle's ICE passes through a first heat recovery unit 104 that is also referred to as HR-1, that operates at the original high temperature of the exhaust gas stream emitted from the ICE, e.g., 300° C. to 650° C., to convert some of the waste heat into electrical or mechanical energy. The moderately cooled exhaust gas stream 112 is then passed to the regeneration unit 110 where liquid sorbent is regenerated by reaction (2) above, in heat exchange using heat from the exhaust gas stream. It will be understood that the exhaust gas stream and sorbent are not in direct contact with each other in the regeneration unit 110. The liquid sorbent 118 is discharged from the regeneration unit at a temperature ranging from 65° C. to 150° C. and is passed to a heat recovery unit 119, also referred to as HR-2, to lower the temperature of the sorbent to a predetermined value. The cooled exhaust gas stream 114 is conveyed to a heat recovery unit 116, also referred to as HR-3, to further lower its temperature to a predetermined value in the range of from 35° to 55° C. The temperature of stream 114 will depend on many factors and is subject to overall process optimization. The factors that affect this temperature include the heat of sorbent regeneration, flow rates and the amount of $CO_2$ that is to be captured from the exhaust gas stream 102.

Exhaust gas stream 120 is then brought into contact with the cooled liquid sorbent in the chemical absorption/adsorption unit 122 where $CO_2$ in the exhaust gas is reacted with a portion of the liquid sorbent in accordance with reaction (1) as described above. The reaction product forms a slurry 124 with the remaining liquid sorbent precursor in the absorption unit and is separated from the exhaust gas in the separation unit 130 using an appropriate apparatus such as a conventional cyclone or a filter (not shown). If the newly formed phase is a liquid, then a liquid/liquid separation decanter is used to separate the $CO_2$-containing, or $CO_2$-rich phase from the rest of the liquid The separated liquid slurry 134 passes to the regeneration unit 110 where its temperature is raised by heat exchange with the hot exhaust gas stream 112 to a predetermined value at which the $CO_2$ is released in accordance with reaction scheme (2) above to produce regenerated liquid sorbent. The remaining lean exhaust gas stream 132 containing a reduced amount of $CO_2$ is released to the atmosphere. The pressure and temperature of $CO_2$ released in the confined space of the regeneration unit 110 could be relatively high. The temperature can be reduced by passage through a heat recovery unit 136, also referred to as HR-4, after which the $CO_2$ is transferred to a pressure tank 140 for temporary storage, or subjected to further densification. A storage tank having external heat exchange fins (not shown) that is in contact with ambient air can be used to effect a temperature reduction of the $CO_2$ gas inside.

Figure 2:
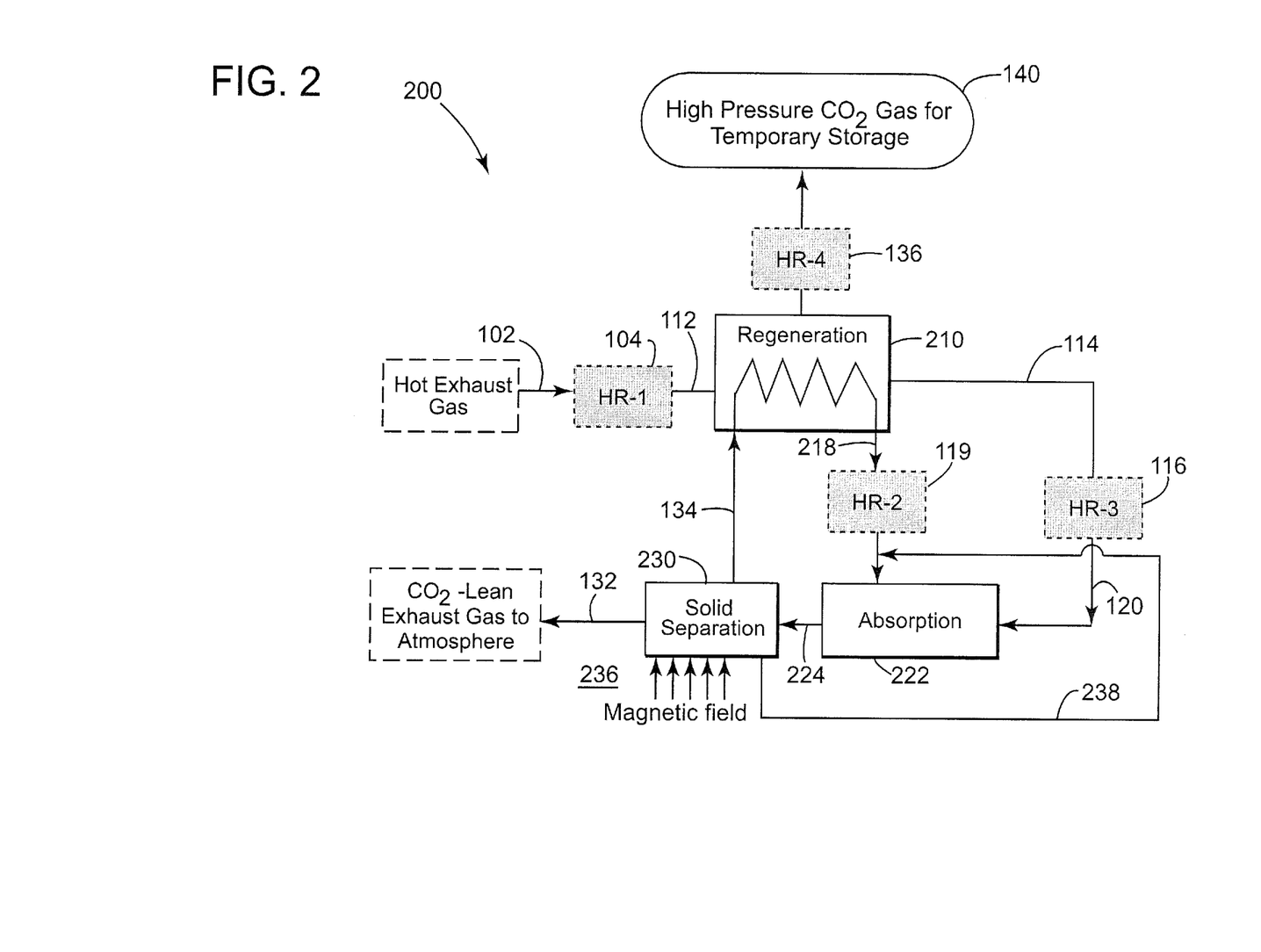
FIG. 2 is a schematic diagram of a system and apparatus for the practice of a $CO_2$ adsorption process in accordance with the invention using a solid capture reagent having a magnetic core.

Another embodiment of the process of the invention is illustrated in FIG. 2 which shows a system and apparatus 200 for capturing $CO_2$ using a solid capture reagent in the form of the magnetically responsive sorbent particle described above that is suspended in a liquid carrier. System 200 includes a regeneration unit 210, an absorption/adsorption unit 222, a magnetic separation unit 230 and several heat recovery devices, identified as HR-1 through HR-4 in FIG. 2. The $CO_2$ capture mechanism used can be physical or chemical sorption. Examples of physical adsorption occur with zeolite-coated magnetic particles and activated carbon-coated magnetic particles that are described above. Examples of chemical absorption occur with amine-coated magnetic particles and the magnesium-sodium mixed salts are described in patent application U.S. Ser. No. 13/744,992 entitled "Mixed Salt $CO_2$ Sorbent, Processes for Making and Uses Thereof", the disclosure of which is incorporated herein by reference.

A liquid suspension of magnetically responsive sorbent 218 is circulated in the system of 200 to capture and release $CO_2$. Captured $CO_2$ is released by heating the capture agent 134 and the operation of the system is similar to that of FIG. 1, as described above. The cooled exhauste gas stream 120 leaving HR-3 enters absorption unit 222. After the step of absorption in unit 222, the liquid suspension of particles 224 is passed to the magnetic separation unit 230 where it is subjected to a magnetic field 236 that causes the particles to rapidly migrate towards one of the poles, thereby separating the particles from the liquid carrier 238, e.g., by gravity flow of the liquid. The liquid, which now is free of the particles containing $CO_2$, is recycled to the absorption/adsorption unit 222 to be mixed with regenerated particles 218.

The particles with absorbed $CO_2$ are removed from the magnetic field 236, as by mechanical means, such as a moving screen or passing scraper and passed as particle stream 134 to the regeneration unit 210. Essentially pure $CO_2$ is desorbed by heat exchange of the particles 134 with the hot exhaust gas, stream in regenerator 210 and processed as described above in FIG. 1.

For some applications, the suspension liquid preferably has a relatively low vapor pressure, e.g., a high boiling point, and a portion remains to wet the surface of the particles after separation in order to facilitate their handling and flow. In other applications, processing of dry particles is preferred and a suspension liquid with a relatively low vapor pressure is used so that it does vaporize when the particles are heated to release the $CO_2$. A suspension liquid with a relatively high vapor pressure would require another unit to condense the liquid vapors that might otherwise leave the regeneration unit with $CO_2$.

The $CO_2$ densification can be accomplished by single or multiple stage compressors with an appropriate active/passive cooling system to ensure pressurization, liquefaction and/or solidification of $CO_2$ for its temporary on-board storage. The $CO_2$ storage can be in a single tank 140 or in multiple tanks (not shown) on board the mobile source. The vehicle's fuel tank(s) can also be used to store the captured $CO_2$ by means of a moving partition or a flexible membrane between the fuel side and the $CO_2$ side storage. Control of all of the system components can be integrated with the mobile source's control system or a separate control system to optimize performance.

Figure 1:
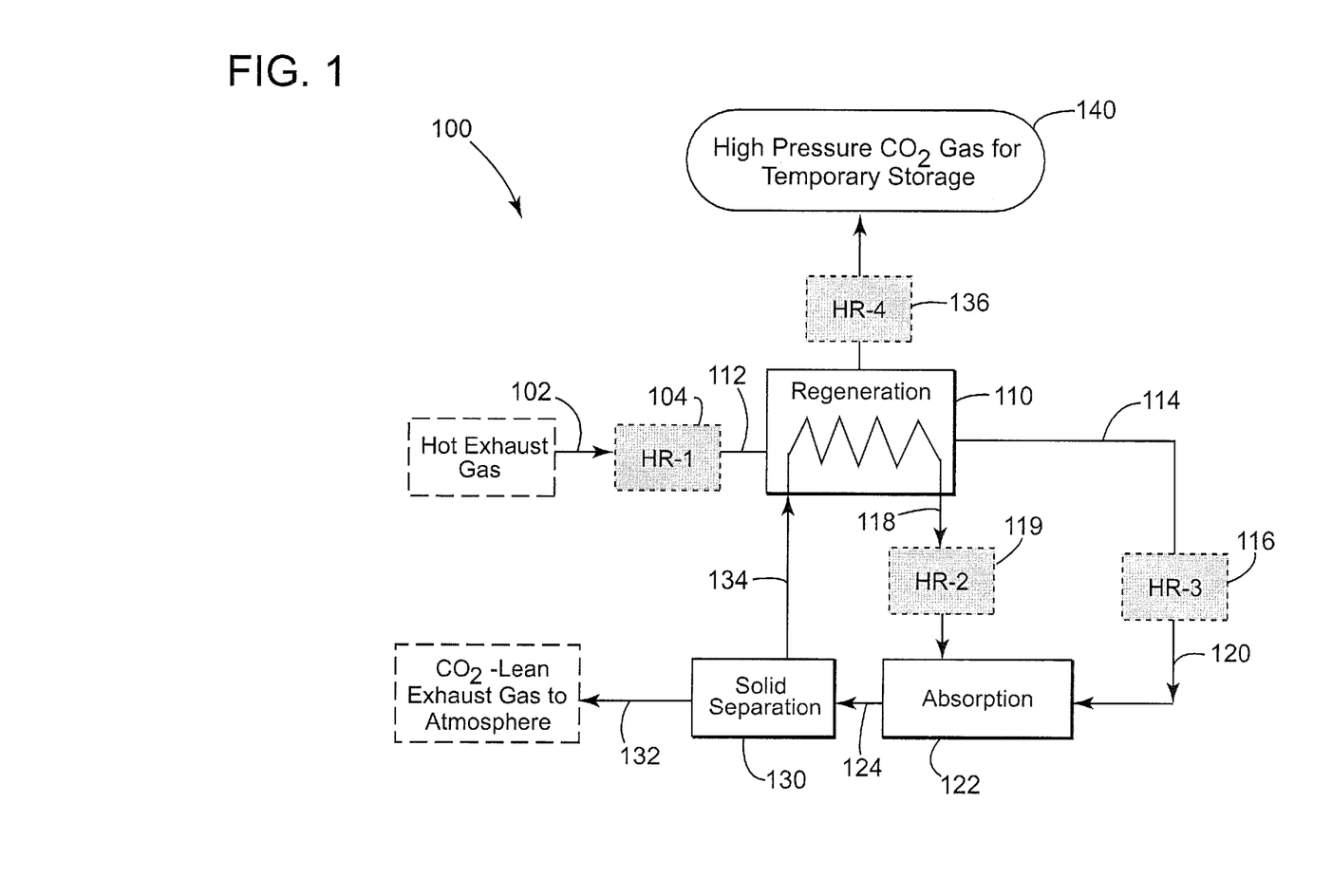
FIG. 1 is a schematic diagram of a system and apparatus for the practice of a $CO_2$ absorption process using chemical phase-changing sorbents in accordance with the invention.

FIGS. 1 and 2 identify locations for placement of heat recovery (HR) components. Single or multiple technologies can be used to convert the waste heat to electrical energy or work to compress the $CO_2$ and to power the auxiliary equipment. The size or capacity, location and operating conditions of the HR components are determined based upon the availability of waste heat, e.g., from the engine exhaust gas stream. This will include both temperature and the volumetric flow rate of the waste heat stream, whether it be the exhaust or engine coolant. A single or more than one type of heat recovery component can be employed depending upon the nature of the waste heat stream and its temperature and flow conditions. The operation of the heat/energy recovery system can be controlled by a pre-programmed processor and controller that receives data from temperature and flow sensors, and that is in controlling communication with flow-regulating valves.

The type of heat recovery component(s) used in the practice of the invention can include, but are not limited to the following types of apparatus.

1. Thermoelectric devices, or modules, that generate electric power. The hot side of the thermoelectric module is installed on the exhaust gas or other hot engine component side and the cold side is installed in a closed cooling system referred to as an active system or exposed to air (a passive system). The thermoelectric module(s) remove part of the heat from the hot side and generate electrical power that can be used to operate the densification apparatus and/or other on-board equipment.

2. A Stirling engine in which the waste heat from the ICE exhaust gas stream is supplied to the wall of one or more cylinders of the engine to expand the gas in the cylinder to thereby drive a piston that can perform the necessary mechanical work to run the densification compressor or to run the compressor of a compression refrigeration cycle unit that provides cold refrigerant to liquefy or solidify the $CO_2$.

3. A steam or organic Rankine cycle in which a generator provides steam or organic vapors to a turbine which generates mechanical work to run the densification compressor or to run the compressor of a compression refrigeration cycle unit that provides cold refrigerant to liquefy or solidify the $CO_2$.

4. A small shape memory alloy engine or compressor that utilizes the waste heat to change the shape of an alloy such as CuSn, InTi, TiNi, and MnCu, and generates mechanical work that is used to increase the density of the captured $CO_2$. The engine compressor works by having a hot side and a cool side of the alloy to generate the compression needed. The following patents describe heat engines based on these types of specialized alloys: U.S. Pat. No. 3,913,326; U.S. Pat. No. 4,055,955; U.S. Pat. No. 5,442,914; U.S. Pat. No. 7,444,812; and published application 2009/0315489. The disclosures of these patent documents are incorporated herein by reference.

Thermoelectric devices used to convert the waste heat to electrical energy can be placed in different locations and arrangements to optimize the energy conversion. The thermoelectric devices can be secured in heat-conductive contact with the exhaust pipe, capture components, engine block or other engine components as the hot side of the device. The cold side of the thermoelectric device can be exposed to air convection to cool the device. The cold side of the thermoelectric device can also be in contact with an active cooling system, e.g., a circulating liquid, to facilitate heat transfer and also control the thermoelectric module's performance. The circulating liquid can be cooled by one or a combination of radiation and convection, e.g., using ambient air.

The thermoelectric devices can be configured in various shapes such as cylindrical or rectangular pipes in order to minimize the pressure drop effects on the exhaust gases. Internal and/or external fins can also be used to enhance the heat transfer of the thermoelectric devices and hence their performance. One or more thermoelectric devices can be mounted in close proximity to, or directly on the engine block, exhaust manifold or other metal components described above in order to take maximum advantage of the high temperatures and temperature differentials. Appropriate materials are selected that will withstand the high temperatures.

Electrical power generated using thermoelectric module(s) can be supplied to an electrical storage system, e.g. batteries, which in turn supply the electrical power to the densification apparatus and/or other equipment. Selection of the semiconductors for the thermoelectric module(s) is based upon the temperature range of the application. Stacking of different thermoelectric devices can be used to optimize the heat recovery and hence the electrical energy generation.

Single or multiple heat recovery systems can be installed on the exhaust gas and coolant systems. Furthermore, single or multiple heat recovery systems can be installed to generate the required power and effectively control the temperature of the exhaust gas.

In addition to supplying power, the heat recovery component(s) can be used to control the temperature of the exhaust gas and hence optimize the performance of the $CO_2$ capture agent.

As will be understood from the above description and examples, the methods and systems of this invention are suitable for use in a wide range of mobile sources such as passenger vehicles, trucks, buses, heavy-duty vehicles, train, ships and others that operate through the combustion of hydrocarbon fuels. This invention can be installed on new mobile sources or by retrofitting existing mobile sources.

The present invention addresses post-combustion $CO_2$ capture and on-board storage from mobile sources. To minimize operational cost and equipment requirements, the available heat, which is conventionally discharged into the atmosphere, is used to provide the energy needed to separate the $CO_2$ extracted from the combustion gases from the absorbent material, or capture agent, and to compress/liquefy all or part of the produced $CO_2$ for efficient on-board storage. The captured $CO_2$ can be stored on board until refueling, when it is discharged or removed for recovery at the fueling station.

The method and system of the present invention have been described above and in the attached drawings; however, modifications derived from this description will be apparent to those of ordinary skill in the art and the scope of protection for the invention is to be determined by the claims that follow.

The invention claimed is:

1. A method for reducing the amount of $CO_2$ discharged into the atmosphere with an exhaust gas stream emitted by an internal combustion engine (ICE) used to power a vehicle, the method comprising:
   a. contacting the exhaust gas stream with a $CO_2$ capture agent on board the vehicle to produce a mixture containing a modified sorbent having captured $CO_2$ and a treated exhaust gas stream having a reduced $CO_2$ content, where the capture agent is selected from a phase-changing liquid that reversibly reacts with $CO_2$ to form a new solid or liquid phase, and magnetically responsive sorbent particles formed from a magnetic core securely coated with a $CO_2$ adsorbing material;
   b. separating the sorbent having captured $CO_2$ from the treated exhaust gas stream;
   c. passing the sorbent having captured $CO_2$ in heat exchange relation with hot engine coolant, transmission fluid, a hot engine compound or the hot exhaust gas stream before the exhaust gas stream is brought into contact with the $CO_2$ capture agent to release $CO_2$ and regenerate the $CO_2$ capture agent;
   d. recycling the regenerated $CO_2$ capture agent for use in step (a);
   e. discharging the treated exhaust gas stream having a reduced $CO_2$ content into the atmosphere;
   f. recovering an essentially pure $CO_2$ gas stream;

g. compressing the recovered $CO_2$ on board the vehicle to reduce its volume; and h. temporarily storing the recovered $CO_2$ on board the vehicle.

2. The method of claim 1 which includes converting heat from the hot exhaust gas stream emitted by the ICE, or the hot engine coolant, hot engine oil, transmission fluid or a hot engine structural component into energy by contact with an energy conversion device, and using the heat-generated energy recovered to compress the $CO_2$ in step (g).

3. The method of claim 1 which operates substantially continuously following start-up of the vehicle's ICE.

4. The method of claim 1, wherein the phase-changing liquid is an ionic liquid, or switchable ionic liquid.

5. The method of claim 4, wherein the ionic liquid is GAP-0 carbamate.

6. The method of claim 4, wherein the phase-changing liquid is selected from the group consisting of liquid di-amines and compounds that are functionalized with one or more amine groups that reversibly combine with $CO_2$.

7. The method of claim 1, wherein the magnetically responsive sorbent particles are suspended in a liquid carrier.

8. The method of claim 7, wherein the liquid carrier is selected from the group consisting of high boiling point liquids or eutectic salt mixtures.

9. The method of claim 7, wherein the magnetically responsive sorbent particles are separated from the treated exhaust gas stream by passing the liquid carrier through a magnetic field.

10. The method of claim 7, wherein the solid sorbent is selected from the group consisting of metal carbonates, bicarbonates, oxides, activated carbon, zeolites, metal-organic framework (MOF) materials and organic-inorganic hybrid materials.

11. The method of claim 7, wherein the magnetic core is selected from the group consisting of iron, cobalt and oxides of iron and cobalt.

12. The method of claim 7, wherein the liquid carrier is one or a combination of (a) a high boiling temperature liquid or a eutectic salt mixture that stabilizes the particles kinetically or thermodynamically; or (b) a high boiling temperature solution of a material that stabilizes the suspended particles kinetically or thermodynamically.

13. A system for on-board treatment of an exhaust gas stream containing $CO_2$ emitted by a hydrocarbon-fueled internal combustion engine used to power a vehicle in order to reduce the amount of $CO_2$ discharged from the vehicle into the atmosphere, the system comprising:

a. an absorption zone containing a $CO_2$ capture agent for removing $CO_2$ from the exhaust gas stream,
  the absorption zone having an inlet for receiving the $CO_2$ capture agent stream and an inlet for introducing the exhaust gas stream,
  the absorption zone also having an outlet for discharging a mixture of a the agent with captured $CO_2$ and a treated exhaust gas stream having a reduced $CO_2$ content;

b. a separation zone for separating the sorbent having captured $CO_2$ from the treated exhaust gas stream; and c. a regeneration zone for releasing the $CO_2$ and regenerating the capture agent using heat exchange with a hot fluid that includes one or more of the exhaust gas stream, hot engine coolant or transmission fluid,
  the regeneration zone including a heat exchanger with an inlet for admitting the agent with captured $CO_2$ and an inlet for introducing the hot fluid,
  the regeneration zone also having an outlet for discharging the regenerated $CO_2$ capture agent, an outlet for the released $CO_2$, and an outlet for discharging a cooled fluid stream.

14. A system for on-board treatment of an exhaust gas stream containing $CO_2$ emitted by a hydrocarbon-fueled internal combustion engine used to power a vehicle in order to reduce the amount of $CO_2$ discharged from the vehicle into the atmosphere, the system comprising:

a. an absorption zone containing a $CO_2$ capture agent for removing $CO_2$ from the exhaust gas stream,
  the absorption zone having an inlet for receiving the $CO_2$ capture agent stream and an inlet for introducing the exhaust gas stream,
  the absorption zone also having an outlet for discharging a mixture of a the agent with captured $CO_2$ and a treated exhaust gas stream having a reduced $CO_2$ content;

b. a separation zone for separating the sorbent having captured $CO_2$ from the treated exhaust gas stream; and c. a regeneration zone for releasing the $CO_2$ and regenerating the capture agent using heat exchange with one or more hot metal engine components, the regeneration zone including a heat exchanger with an inlet for admitting the agent with captured $CO_2$, the heat exchanger having surfaces comprising metal engine components and/or surfaces in heat transfer relation with metal engine components, the regeneration zone also having an outlet for discharging the regenerated $CO_2$ capture agent and an outlet for the released $CO_2$.

15. The system of claim 12 which further comprises one or more waste heat recovery zones for recovery of heat energy from the exhaust gas stream.

16. The system of claim 14 which further comprises compressing the recovered $CO_2$ gas on board the vehicle to reduce its volume using energy recovered from the heat of the exhaust gas stream.

17. The system of claim 14, wherein the $CO_2$ capture agent is a phase-changing switchable ionic liquid that reversibly reacts with $CO_2$ to form a solid compound.

18. The system of claim 14, wherein the $CO_2$ capture agent is a phase-changing liquid or solution that reversibly reacts with $CO_2$ to form a new two-phase liquid mixture.

19. The system of claim 14, wherein the $CO_2$ capture agent is a suspension of magnetically responsive sorbent particles in a liquid carrier.

20. The system of claim 19, wherein the magnetically responsive sorbent particles are separated from the treated exhaust gas stream using a magnetic field.

* * * * *